United States Patent [19]

Kaya et al.

[11] Patent Number: 4,481,567
[45] Date of Patent: Nov. 6, 1984

[54] ADAPTIVE PROCESS CONTROL USING FUNCTION BLOCKS

[75] Inventors: Azmi Kaya, Akron; Michael P. Lukas, Eastlake, both of Ohio

[73] Assignee: The Babcock & Wilcox Company, New Orleans, La.

[21] Appl. No.: 353,262

[22] Filed: Mar. 1, 1982

[51] Int. Cl.³ .............................................. G05B 13/02
[52] U.S. Cl. ..................................... 364/157; 364/162
[58] Field of Search ............... 364/148, 155, 157, 158, 364/159, 160, 162; 318/561, 609, 610

[56] References Cited

U.S. PATENT DOCUMENTS

| | | | |
|---|---|---|---|
| 3,534,400 | 10/1970 | Dahlin ................................. | 364/157 |
| 3,543,010 | 11/1970 | Dahlin ................................. | 364/157 |
| 3,622,767 | 11/1971 | Koepcke .............................. | 364/157 |
| 4,214,300 | 7/1980 | Barlow et al. ..................... | 364/157 X |
| 4,368,510 | 1/1983 | Anderson .......................... | 364/157 X |

Primary Examiner—Joseph F. Ruggiero
Attorney, Agent, or Firm—Vytas R. Matas; Robert J. Edwards

[57] ABSTRACT

An adaptive control for a process is disclosed which utilizes a process parameter calculator made up of simple function blocks which generate a plurality of process parameters, and a tuning parameter calculator, also made up of simple function blocks, for calculating tuning parameters from the process parameters.

The process parameter calculator is provided with values for various disturbances, a set point, a control output from a process controller and process structure data including process sensitivity and nominal operating data. From these values, the process parameters are determined. The tuning parameter calculator is provided in addition to the process parameters, with performance parameters and design function for generating tuning parameters that are applied to the controller for modifying the control output in response thereto.

3 Claims, 7 Drawing Figures

ADAPTIVE PROCESS CONTROL USING FUNCTION BLOCKS

FIELD AND BACKGROUND OF THE INVENTION

The present invention relates, in general, to process control for controlling the output of an industrial process, and in particular to a new and useful adaptive process control which is made up of individual function blocks assembled to generate one or more tuning parameters, without the use of a computer or corresponding computer software.

The automatic control of various industrial processes, such as those found in chemical, power and heat transfer plants, involves the identification and manipulation of plant parameters and disturbances to produce suitable control signals.

Many adaptive controls require on-line identification of such parameters which means that a digital computer is required. See for example D. E. Seborg and D. G. Fisher "Experience with Experimental Applications of Multivariable Computer Control," *ASME Paper 78-WA/DSC-26*; and H. Unbehauen, et al "Comparison and Application of DDC Algorithms for a Heat Exchanger", *Journal of Automatica*, Vol. 12, 1976, pp. 393–402.

As disclosed in G. Schinskey "Process Control Systems", Chapter 6, McGraw-Hill, 1978, some low-level controls which are referred to as selective and adaptive controls, can be implemented by analog control equipment. The function of selective control is to select the variable to be controlled on a multi-variable process having a single feed-back control loop. Adaptive control changes the values of control paramaters as the process parameters (such as flow) vary.

In addition, optimum control values can be found by way of optimum tuning processes for a given operating condition of a process. See, for example, A. A. Rovira, et al., "Tuning Controllers for Set Point Changes," *Instruments and Control Systems*, December 1969. In this arrangement, the choice has to be made as to whether optimum control values are to be tuned for a set point change or for various disturbances in the process. Such disturbances include changing values of temperature, flow rate and the like.

Even in single loop controls, computers are being utilized due to the flexibility offered. Accordingly, the use of computers for control of a process have increasingly replaced analog control equipment. See E. B. Dahlin, "Designing and Tuning Digital Controllers", Instruments and Control Systems, June 1968.

Shortcomings of the four mentioned approaches to process control include the expensive use of computers with corresponding software programs and adaptive controls. Shortcomings of the low-level control approaches include a lack of in-depth consideration of the dynamic characteristics, which in-depth consideration is desirable for proper process performance under varying operating conditions. That is, analog controls are not sufficiently accurate or flexible for the calculations necessary to achieve desired performance.

SUMMARY OF THE INVENTION

A main object of the present invention is to provide an adaptive control which overcomes the shortcomings of the prior art. This is accomplished by the utilization of a microprocessor which contains a plurality of function blocks which are assembled into an arrangement for achieving the adaptive control without the requirement for computers or software programs. The adaptive control, according to the invention, is provided effectively by the combination of function blocks which synthesize the adaptive control scheme which is otherwise available only by computer.

According to the invention, the process parameters are generated and utilized to determine optimum controller tuning parameters. These tuning parameters are updated for varying operating conditions. The adaptive control is improved over the prior art use of analog equipment in that in-depth consideration of dynamic characteristics is provided.

Accordingly, another object of the present invention is to provide an adaptive control for a process having a controller for generating a control output, a set point, a process output and a plurality of disturbances, comprising, a process parameter controller for receiving the disturbances, the control output and the set point, and for generating a plurality of process parameters, each process parameter being the sum of selected functions of the disturbances, set point and control output, and a tuning parameter calculator connected to the process parameter calculator for receiving the plurality of parameters and at least one design function, the tuning parameter calculator generating at least one tuning parameter and applying the tuning parameter to the controller for controlling the control output and thereby controlling the process.

Another object of the invention is to provide such an adaptive control wherein the process parameter calculator and the tuning paramater calculator are assembled of simple function blocks for generating the selected and design functions and for adding the functions to produce the process and tuning parameters.

A still further object of the invention is to provide an adaptive control which is simple in design, rugged in construction and economical to manufacture.

For an understanding of the principles of the invention, reference is made to the following description of typical embodiments thereof as illustrated in the accompanying drawings.

DESCRIPTION OF THE PREFERRED EMBODIMENTS

Figure 1:
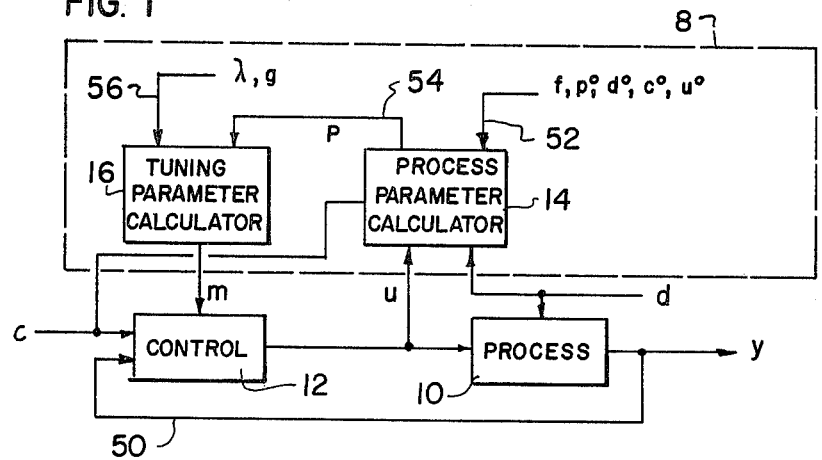
FIG. 1 is a block diagram of the adaptive control system according to the invention.

Referring to the drawings, in particular, the invention embodied therein in FIG. 1 comprises an adaptive control system for a process 10 which is controlled by a control system 12. The control system is provided with a feedback control loop over line 50 from the process output (y) to one input of the control system 12. The control system 12 is also provided with a set point (c) and generates a control output signal (u).

According to the invention, an adaptation mechanism 8 is provided which establishes an outer or adaptive loop between the process 10 and the control system 12.

A process 10 includes a plurality of disturbances (d) which comprise variations in temperature, flow rate and the like. The control system 12 is also provided with one or more tuning parameters (m) for controlling the control output (u).

The adaptation mechanism 8 comprises a process parameter calculator 14 which receives the disturbances, the control output and the set point, and also a plurality of process structure data over line 52. The process parameter calculator is connected to a tuning parameter calculator 16 which receives process parameters from the process parameter calculator 14 over line 54 and design data information over line 56.

The adaptation mechanism 8 computes the control tuning parameters (m) in a two-step process. First, all available information (control output, process output, and measurable disturbances) is used to compute the most current values of various process parameters (P). Then, these values are used to compute the "best" tuning parameters (m) for this process by means of a selected design rule.

Figure 2:
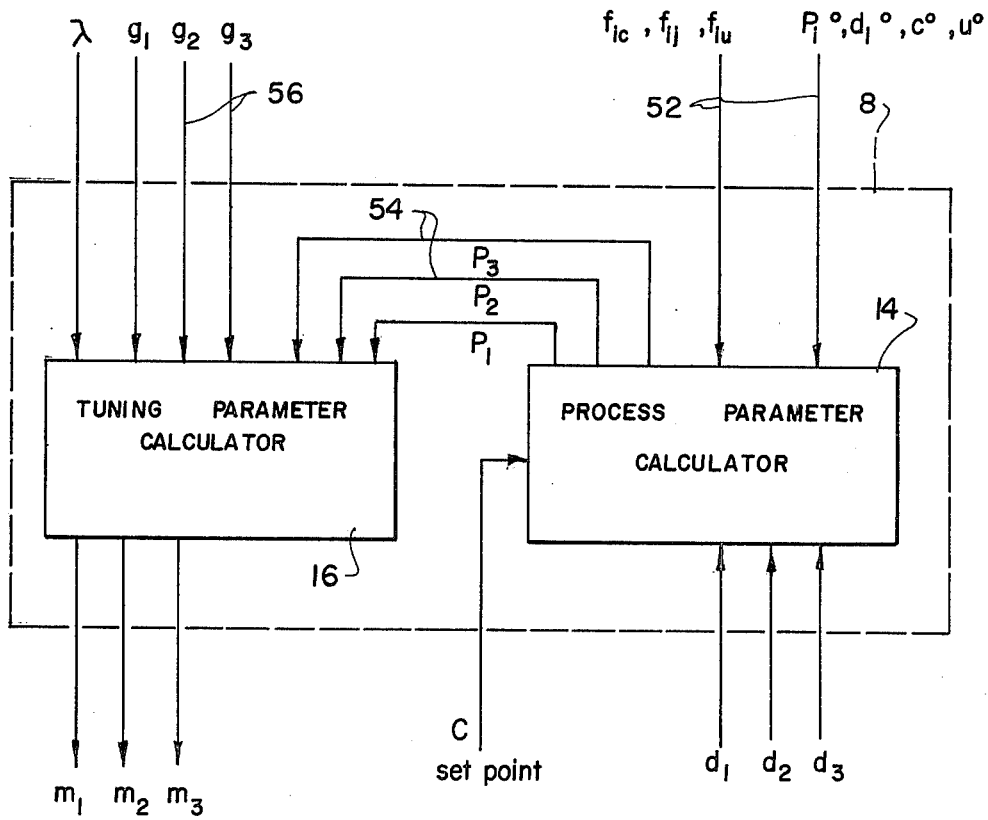
FIG. 2 is a block diagram of the adaptation mechanism for establishing the adaptive control in the system of FIG. 1.

In FIG. 1, a process with a single input u and single output y is considered. In FIG. 2, three disturbances $d_1$, $d_2$, $d_3$, and three process parameters $P_1$, $P_2$, $P_3$, are shown although there is no restriction on the number of disturbances and process parameters. FIG. 2 also shows three tuning parameters $m_1$, $m_2$, $m_3$, to be calculated within adaptation mechanism 8. Three tuning parameters are common for a PID (proportional plus integral plus derivative) controller in the process industry, although the invention is not limited to this number.

Figure 3:
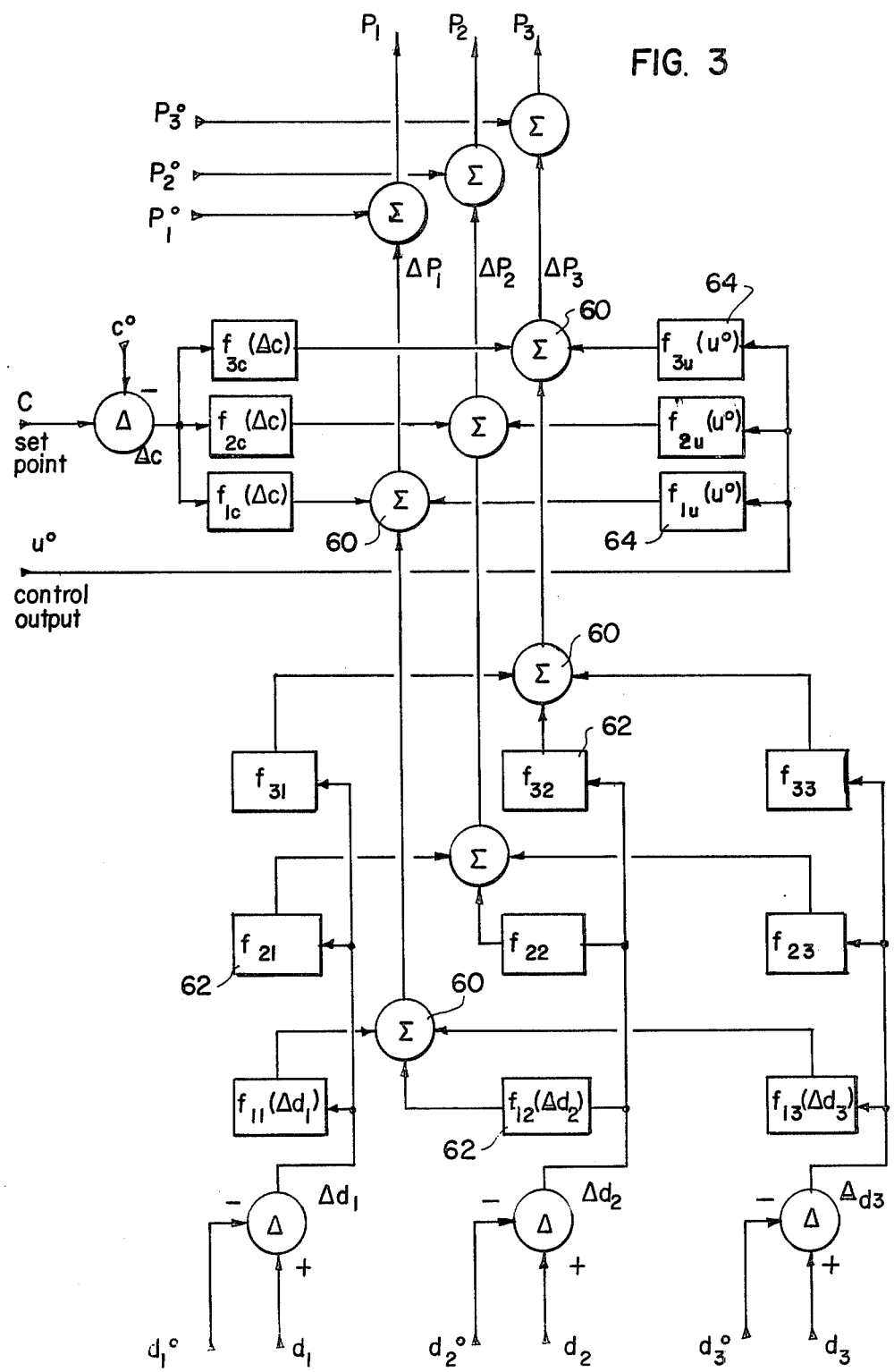
FIG. 3 is a block diagram of a process parameter calculator for receiving a plurality of disturbances, the control output and the set point, and for generating a plurality of process parameters.
Figure 4:
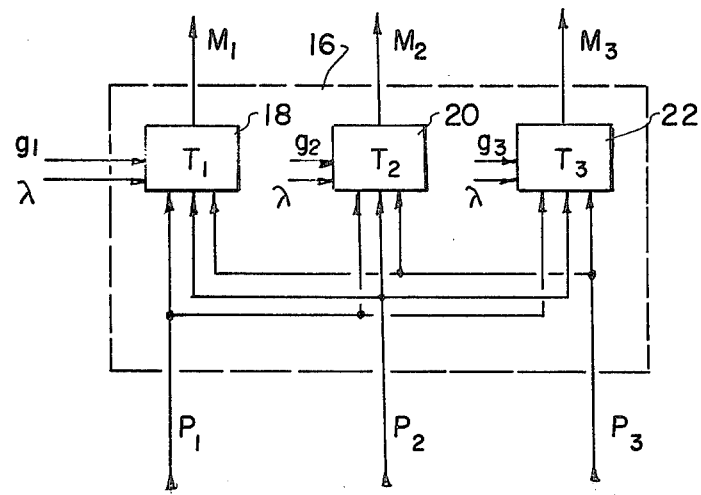
FIG. 4 is a block diagram of a tuning parameter calculator for receiving the process parameters and generating a plurality of tuning parameters according to design functions and information.

FIG. 3 shows details of the Process Parameter calculator 14. Process sensitivity data are determined from a model process off-line. Process sensitivity functions determine the variations of process parameters with respect to variation in operating conditions such as set point, control, and disturbances. FIG. 4 shows the Tuning Parameter Calculator 16. Note that no details are given for the blocks $T_1$, $T_2$, $T_3$ since the design rules incorporated in these blocks are well-known to persons skilled in the art of industrial control system design.

Referring once more to FIG. 2, it is noted that the process structure data or information over lines 52 include process sensitivity data labelled $f_{ic}$, $f_{ij}$, $f_{iu}$. The $i$ of the process sensitivity functions are an integer which correspond to the process parameter p, and the $j$, also an integer, corresponds to the disturbances d. The $c$ and $u$ correspond respectively to set point and control output dependencies of the process parameters p. The process sensitivity functions can be determined as follows:

$$f_{ij} = \frac{\partial P_i}{\partial d_j}$$

$$f_{ic} = \frac{\partial P_i}{\partial c}$$

$$f_{in} = \frac{\partial P_i}{\partial u}$$

In FIG. 3, the process parameter calculator is shown made up of a plurality of function blocks including summing blocks 60 and function generating blocks 62 which generate functions of changes in the three disturbances. Function blocks 64 are also included which generate functions of the set point, or differences in set point from a nominal set point c°.

The subscript of the functions in the disturbance function blocks 62 have a subscript with a first digit which represents the summing stage and a second digit which represents the disturbance. For example, in the first summing stage, the functions $f_{11}$, $f_{12}$, and $f_{13}$ are added.

The set point and control output function generators 64 are similarly identified. In each case, a superscript° signifies a nominal value. For example, u° is the nominal control output.

Figure 5:
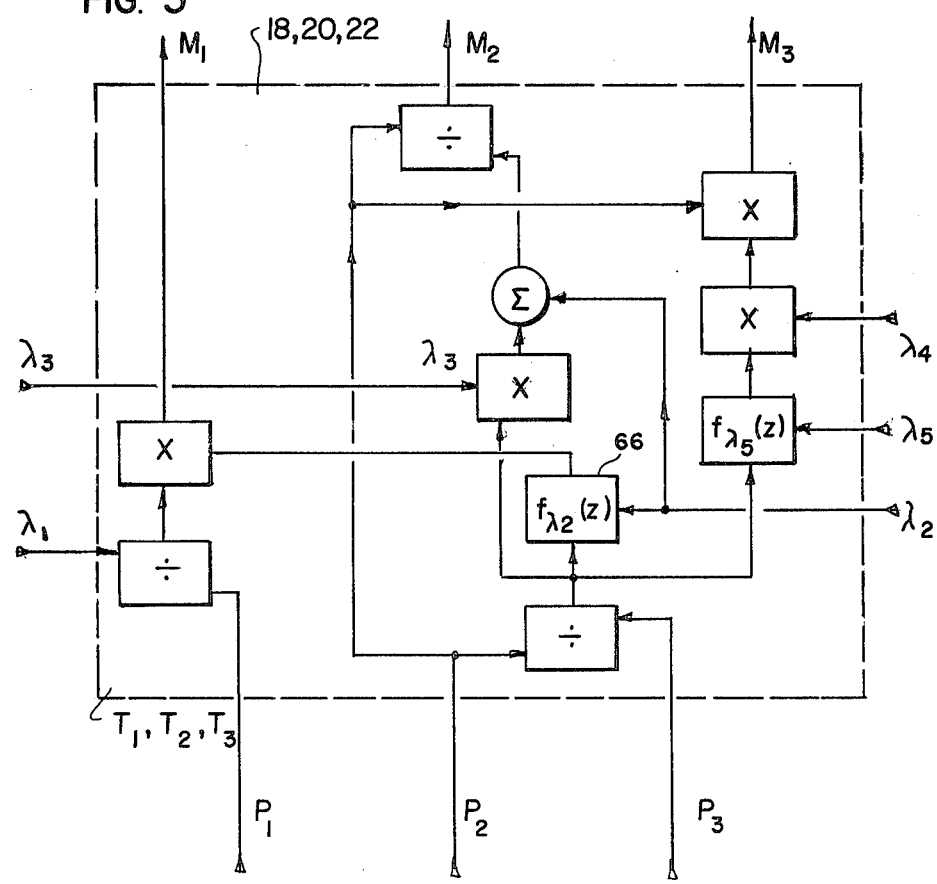
FIG. 5 is a block diagram of an exemplary tuning parameter calculator showing the use of simple function blocks for implementing the design function.

Referring now to FIG. 5, an example of the tuning parameter calculator is shown to demonstrate the workability of the invention. The terms as used in the following relationship are defined as follows:

a, b, c, e, and f are empirical constants
$K_c$ is the controller gain
K is the process gain
$T_i$ is the reset (integral) time
$T_d$ is the derivative time
$\theta/\tau$ is the ratio of dead time to time constant.

The process parameters $P_1$, $P_2$, $P_3$ correspond to $K, \theta, \tau$ and the tuning parameters $M_1$, $M_2$ and $M_3$ correspond to the values $K_c$, $T_i$, and $T_d$.

The empirical constants a through f correspond to performance parameters $\lambda_1$ through $\lambda_5$, respectively.

The relationships between the tuning parameters Kc, Ti, and Ta and the other process parameters for proper control system operation are well-known to persons skilled in the art of industrial control system design. To illustrate the disclosed adaptive design technique, the following relationships are used. (following the article by A. A. Rovira, et al., "Tuning Controllers for Set Point Changes," published in *Instruments and Control Systems*, December 1969):

$$K_c = \frac{a}{K}\left(\frac{\theta}{\tau}\right)^b \tag{1a}$$

$$T_i = \frac{\tau}{b + c\left(\frac{\theta}{\tau}\right)} \tag{1b}$$

$$T_d = \tau\left[e\left(\frac{\theta}{\tau}\right)^f\right] \tag{1c}$$

Letting:
$a = \lambda_1$   $K = P_1$   $M_1 = K_c$
$b = \lambda_2$   $\tau = P_2$   $M_2 = T_i$
$c = \lambda_3$   $\theta = P_3$   $M_3 = T_d$
$e = \lambda_4$ -continued $$f = \lambda_5$$

The general block diagram of FIG. 4, becomes specific as shown in FIG. 5. The equations become:

$$M_1 = \frac{\lambda_1}{P_1}\left(\frac{P_3}{P_2}\right)^{\lambda_2} \quad (2a)$$

$$M_2 = \frac{P_2}{\lambda_2 + \lambda_3\left(\frac{P_3}{P_2}\right)} \quad (2b)$$

$$M_3 = P_2\left[\lambda_4\left(\frac{P_3}{P_2}\right)^{\lambda_5}\right] \quad (2c)$$

The power functions are described by function blocks 66 in FIG. 5.

Figure 6:
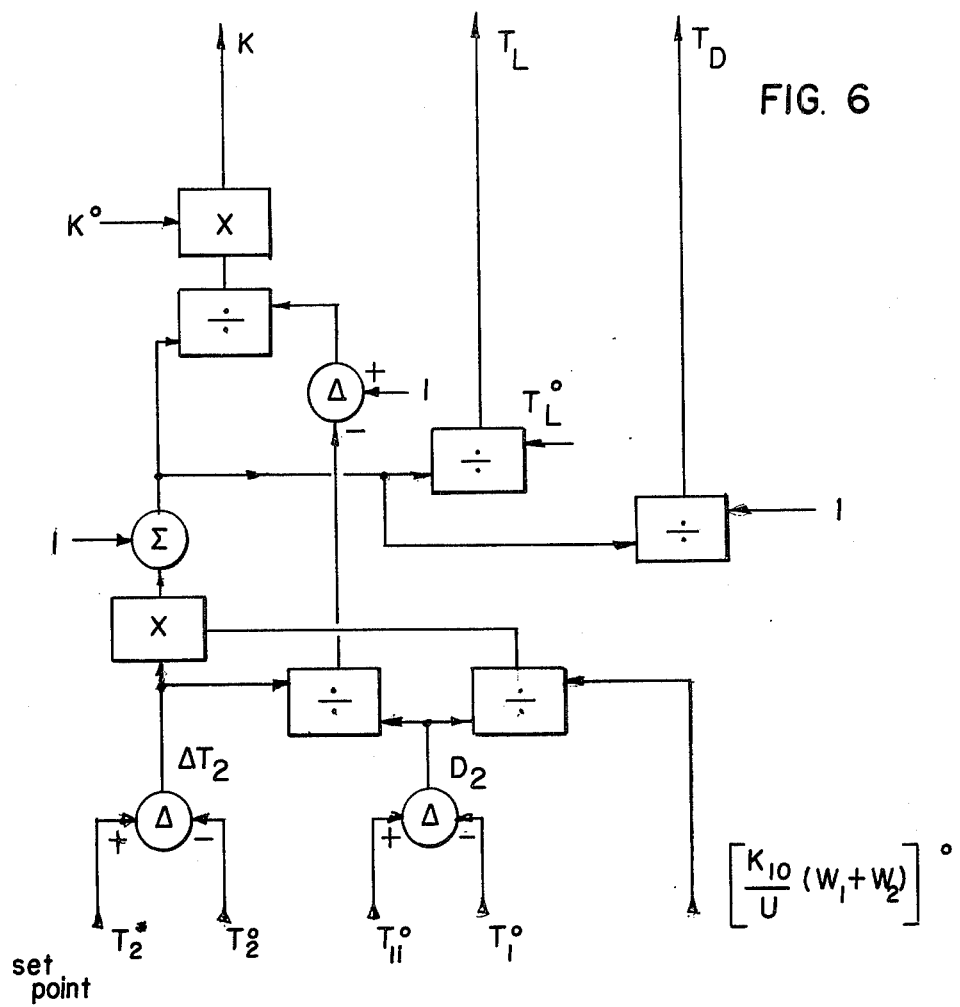
FIG. 6 is a block diagram of an exemplary process parameter calculator showing the implemention of the invention using simple function blocks.
Figure 7:
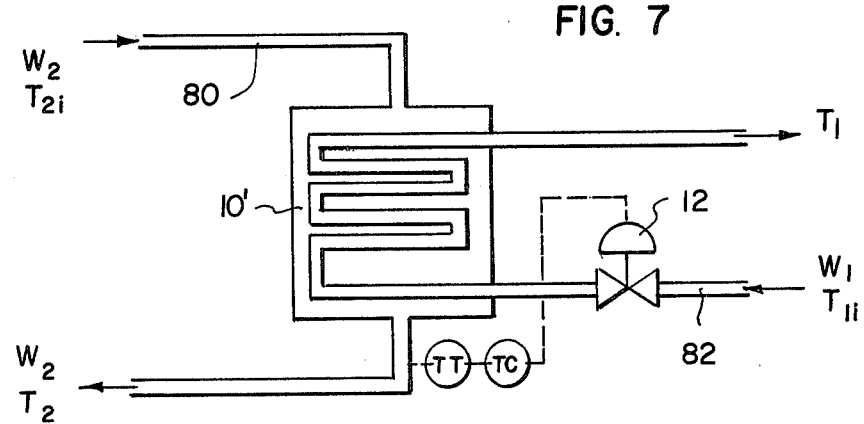
FIG. 7 is a schematic representation of a heat exchanger exemplifying the process with a control valve exemplifying the controller of the invention.

Furthermore, as a part of the present invention, Process Parameter Calculator 14 can be demonstrated for a heat exchanger shown in FIG. 7. FIG. 6 shows the specific Process Parameter calculator 14 for the heat exchanger.

In FIG. 7, a counterflow heat exchanger is shown as an exemplary process 10. Cold fluid enters line 80 at a flow rate $W_2$ and a temperature $T_{2i}$. Its output temperature $T_2$ is controlled by a flow of hot fluid over line 82 which flows at a rate $W_1$ and has an input temperature $T_{1i}$. The hot fluid exits the heat exchanger at an uncontrolled temperature $T_{1o}$.

In FIG. 6, values with a superscript again represent nominal values. For heat exchanger of FIG. 7, the following relationship can be demonstrated:

$$K = K^o\left[1 - \frac{\Delta T_2}{D_2}\right]\left[\frac{1}{1 + D_1\Delta T_2}\right] \quad (3a)$$

$$T_L = T_L^o\left[\frac{1}{1 + D_1\Delta T_2}\right] \quad (3b)$$

$$T_D = T_D^o\left[\frac{1}{1 + D_1\Delta T_2}\right] \quad (3c)$$

where
$K = P_1$    $\Delta T_2 = T_2^* - T_2^o$
$T_L = P_2$    $T_2^* = $ set point $= c$
$T_D = P_3$    $D_2 = T_{1i}^o - T_i^o$ $$D_1 = \left[\frac{K_{10}}{UD_2}(W_1 + W_2)\right]^o$$

$$K_{10} = \left(\frac{\partial U}{\partial W_1}\right)^o$$

$U = $ overall heat transfer coefficient.

In the foregoing relationships, the parameters $K^o$, $T_D^o$, and $T_L^o$ are the equivalent dynamic parameters of the heat exchanger as measured by a reaction curve at the nominal operating conditions. The parameters $D_1$, $D_2$, $T_2^o$, and $K_{10}$ also are evaluated at these nominal conditions.

FIG. 6 shows the manipulation of the terms to generate the three process parameters $P_1$, $P_2$ and $P_3$, or their counterparts K, $T_L$, and $T_D$.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

What is claimed is:

1. An adaptive control for a process having a controller for generating a control output, the process having a set point, a process output and a plurality of disturbances comprising:

a process parameter calculator for receiving the disturbances, the control output and the set point, and generating a plurality of process parameters, each being a sum of selected functions of each of the disturbances, control output and set point; and a tuning parameter calculator connected to said process parameter calculator for receiving said plurality of process parameters and for receiving at least one design function and at least one performance parameter, said tuning parameter calculator including means for generating at least one tuning parameter as a function of said process parameters, said at least one design function and said at least one performance parameter, said tuning parameter calculator connected to the controller for applying said at least one tuning parameter to the controller;

said process and tuning parameter calculators both comprising a plurality of function blocks connected to each other for manipulating values received according to said selected functions and at least one design function.

2. An adaptive control wherein the process is a heat exchanger having a cold fluid input with cold fluid flow, cold fluid input temperature and cold fluid output temperature, and a hot fluid input with hot fluid flow, hot fluid input temperature and hot fluid output temperature, said process parameter calculator comprising a first function block for establishing a change in cold fluid temperature, a second function block for establishing a change in hot fluid temperature, a third function block for dividing said cold water fluid change in temperature by said hot fluid change in temperature, a fourth function generator for dividing a value which is a function of the cold and hot fluid flow rates by said hot fluid temperature change, a fifth function block for multiplying the cold fluid temperature change by an output of said fourth function block, a sixth function block for adding a value 1 to an output of said fifth function block, a seventh function block for subtracting an output of said third function block from the value 1, an eighth function block for dividing a nominal value for a second process parameter by the output of said sixth function block to produce a second process parameter, a ninth function block for dividing a nominal value for a third process parameter by the output of said sixth function block to generate a third parameter, a tenth function block for dividing the output of said seventh function block by the output of said sixth function block and an eleventh function block for multiplying an output of said tenth function block by a nominal value for a first process parameter to generate a first process parameter.

3. An adaptive control according to claim 1, wherein said process is PID controlled, said process parameter calculator generating a first, a second and a third process parameter, said tuning parameter calculator comprising a first function generator for dividing a first performance parameter by said first process parameter, a second function block for dividing said third process parameter by said second process parameter, a third function block for raising an output of said second function block to a power corresponding to a second performance parameter, a fourth function block for multiplying an output of said third function block by an output of said first function block to generate a first tuning parameter, a fifth function block for raising the output of said second function block to a power corresponding to a fifth performance parameter, a sixth function block for multiplying the output of said second function block by a third performance parameter, a seventh function block for summing an output of said sixth function block with said second performance parameter, an eighth function block for dividing said third process parameter by an output of said seventh function block to generate a second tuning parameter, a ninth function block for multiplying an output of said fifth function block by a fourth performance parameter, and a tenth function block for multiplying said second process parameter by an output of said ninth function block to generate a third tuning parameter.

* * * * *